(No Model.)
J. MARSHALL.
BOWLDER GRAPPLE.
No. 271,490. Patented Jan. 30, 1883.
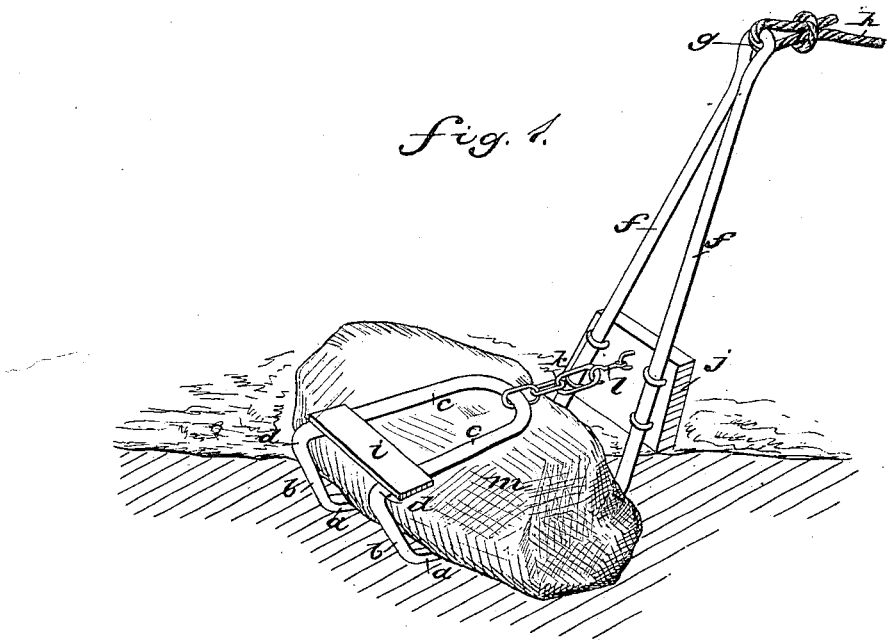
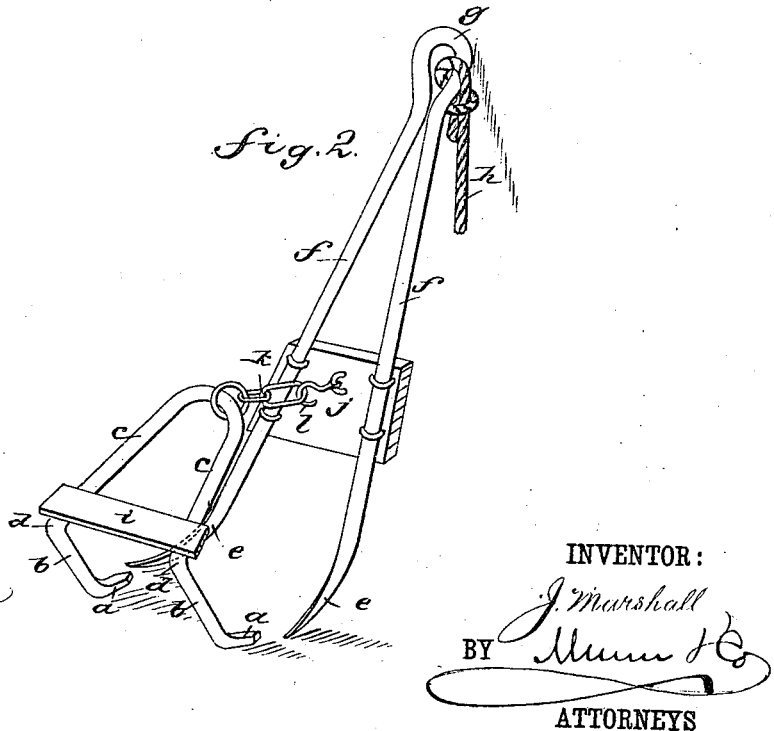
WITNESSES:
Otto Beyer
C. Sedgwick
INVENTOR:
J. Marshall
BY Munn & Co
ATTORNEYS

UNITED STATES PATENT OFFICE.

JOHN MARSHALL, OF CORDOVA, ILLINOIS.

BOWLDER-GRAPPLE.

SPECIFICATION forming part of Letters Patent No. 271,490, dated January 30, 1883.

Application filed September 11, 1882. (No model.)

*To all whom it may concern:*

Be it known that I, JOHN MARSHALL, of Cordova, in the county of Rock Island and State of Illinois, have invented a new and Improved Bowlder-Grapple, of which the following is a full, clear, and exact description.

My invention consists of a couple of pairs of grapple-hooks contrived for readily hitching onto bowlders partially embedded in the ground and raising and hauling them away by a team hitched on after the grapple is hitched to the stone, the object being to provide a simple and efficient means of removing bowlders from the soil preparatory to cultivating the same, all as hereinafter fully described.

Reference is to be had to the accompanying drawings, forming part of this specification, in which similar letters of reference indicate corresponding parts in both the figures.

Figure 1 is a perspective view of my improved grapple attached to a stone ready for hauling it away; and Fig. 2 is a perspective view of the grapple in the same position as in Fig. 1, but without the stone.

One pair, $a$, of the grapple-hooks is formed on the ends of the arms $b$ of a U or yoke shaped bar, $c$, of steel or iron, the said arms being bent or curved at $d$ at about right angles to the plane of the yoke, about the middle of their length. The other pair of hooks, $e$, consist of slightly-bent points of the long metal arms $f$ of a fork-shaped bar, having an eye, $g$, at the head for the attachment of a rope or chain, $h$, by which to hitch on a team for drawing the bowlder out of its bed and away therefrom. Both pairs of hooks are stiffened by back-stays $i j$, and the yoke $c$ has a short section of chain, $k$, by which to connect it to the back-stay $j$ of the fork $f$ by the hook $l$.

To connect the grapple with a bowlder, $m$, first remove the earth sufficiently from one side to enable the hooks $a$ to be presented below the bulge of the bowlder, the yoke lying on the upper surface the same as represented in Fig. 1. Then similarly remove the earth from the other side for the points $e$, if necessary, or they may be thrust into the earth, and lay the fork $f$ across the top of the bowlder with points downward and toward the side opposite the one engaged by hooks $a$, and with the upper end of the fork projecting over yoke $c$. Then hitch the two parts together by chain $k$ and hitch the team to the chain $h$ and drive in the direction indicated in Fig. 1. The bowlder will thus be rolled over and upward out of its bed onto the fork $f$ and the back-stay $j$, said back-stay consisting of a plank which, together with the fork, forms a kind of sled or stone-boat, on which to draw the bowlder away.

The contrivance is simple to construct, light and easy to handle, and is manifestly efficient for the purpose for which it is designed.

Having thus fully described my invention, I claim as new and desire to secure by Letters Patent—

1. The combination, in a bowlder-grapple, of the hook-armed yoke $c$, hook-pointed fork $f$, and connecting-hook and chain $k$ $l$, substantially as described.

2. The fork $f$, having hitching-chain $h$, and back-stay plank $j$, in combination with the hook-armed yoke $c$, connecting-chain $k$, and hook $l$, substantially as described.

JOHN MARSHALL.

Witnesses:
J. L. COOL,
C. B. TAVENNER.